Aug. 30, 1932.  E. J. KEARNEY  1,874,305
MACHINE TOOL
Filed Oct. 10, 1928   3 Sheets-Sheet 1
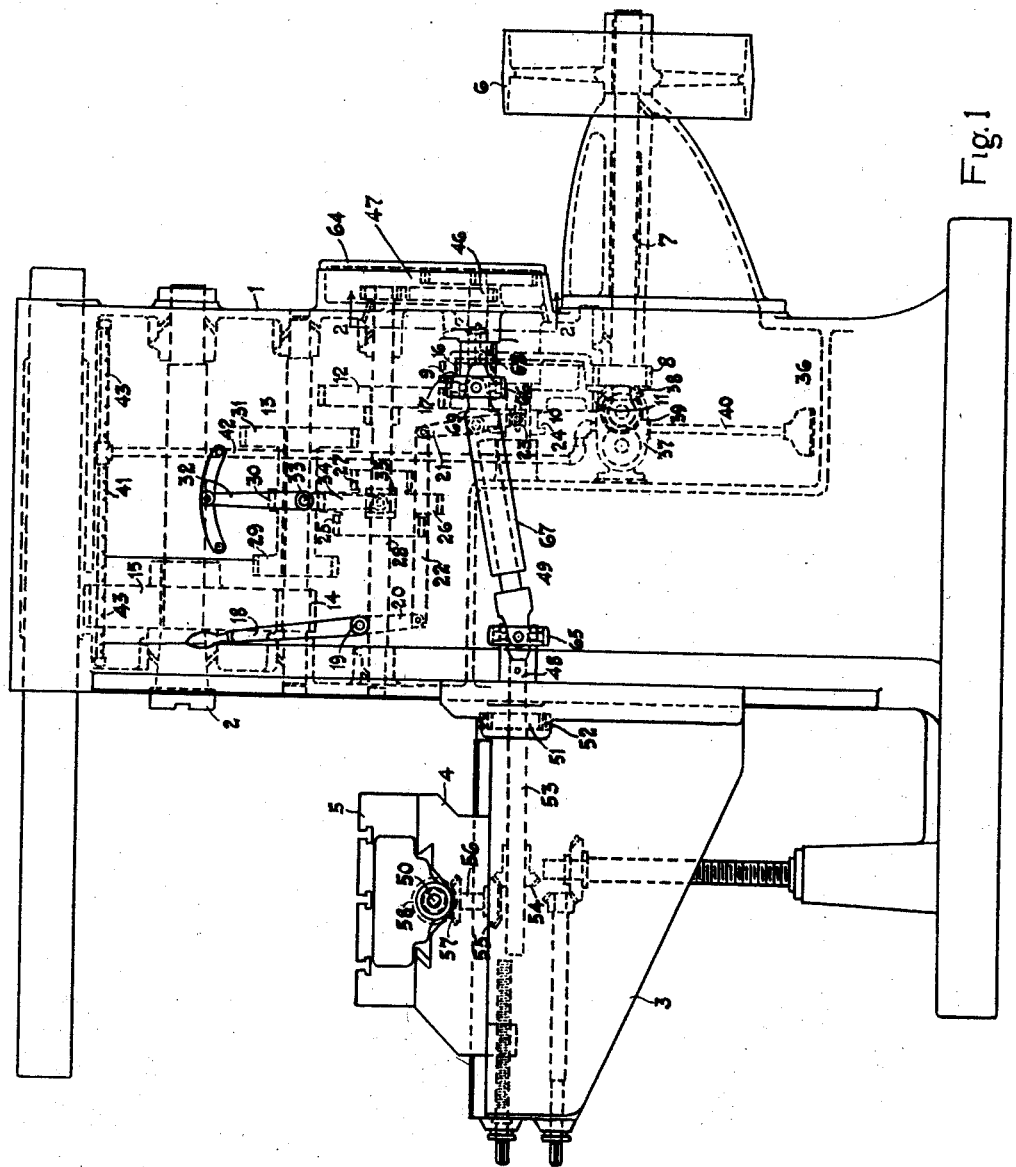
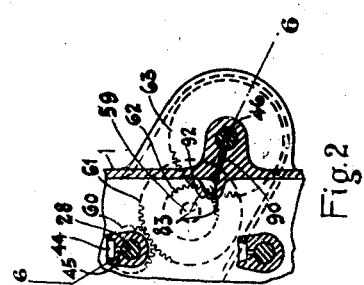
INVENTOR
Edward J Kearney
BY
Fred G Parsons
ATTORNEY Aug. 30, 1932.　　　E. J. KEARNEY　　　1,874,305
MACHINE TOOL
Filed Oct. 10, 1928　　　3 Sheets-Sheet 2

INVENTOR
Edward J Kearney
BY
Fred G Parsons
ATTORNEY

Aug. 30, 1932.                    E. J. KEARNEY                    1,874,305
                                   MACHINE TOOL
                           Filed Oct. 10, 1928           3 Sheets-Sheet 3

INVENTOR,
Edward J. Kearney
BY Fred G. Parsons
ATTORNEY

Patented Aug. 30, 1932

1,874,305

UNITED STATES PATENT OFFICE

EDWARD J. KEARNEY, OF WAUWATOSA, WISCONSIN, ASSIGNOR TO KEARNEY & TRECKER CORPORATION, OF WEST ALLIS, WISCONSIN

MACHINE TOOL

Application filed October 10, 1928. Serial No. 311,429.

This invention relates to machine tools and particularly to transmission and lubrication mechanism therefor and is a continuation in part of a previous application, Serial No. 83,459, filed January 25, 1926.

The main object of this invention is to provide improved construction of certain machine tool transmission portions or members which are difficult to lubricate satisfactorily, so as to admit of improved lubrication thereof.

A further purpose is to combine such improved parts with an improved lubricating system and to provide for automatic lubrication of such parts.

A further purpose is to provide a machine tool having improved universal joint construction and improved lubricating means therefor.

Other objects will be apparent from this specification.

The invention consists in certain novel features of construction and in the combination of parts as hereinafter described and claimed and in such modifications as may be equivalent to the structure claimed.

In the accompanying drawings, the same parts are designated with the same reference characters throughout.

Fig. 1 shows a right side elevation of a milling machine of the knee and column type embodying the invention.

Fig. 2 is a partial vertical section taken along line 2—2 of Fig. 1.

Figure 3:
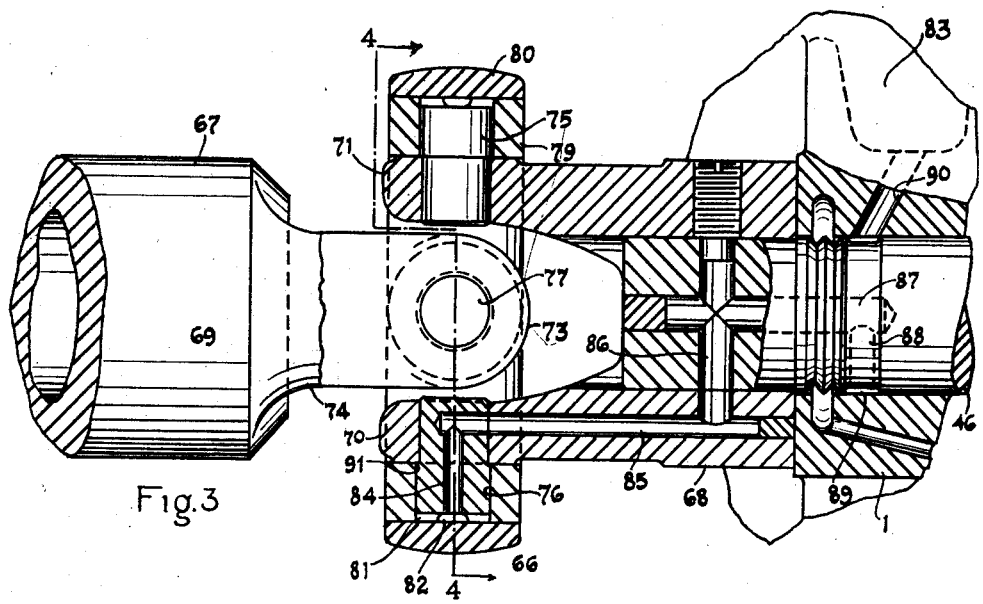
Fig. 3 is an enlarged view of a portion of the machine including a universal joint shaft shown in Fig. 1, partly in vertical section.

The machine includes a hollow column 1, a spindle 2 rotatably journaled therein, a knee 3 vertically slidable on the column, a saddle 4 slidable toward and from the column on knee 3, and a table 5 longitudinally slidable on saddle 4, such construction providing movement of table 5 in three mutually transverse directions relative to spindle 2. Spindle 2 may be driven from a pulley 6 through a train housed within the hollow column, and including a shaft 7, gears 8—9, a clutch generally denoted by the numeral 10, gears 11—12, a rate changer generally denoted by the numeral 13, and gears 14—15.

Clutch 10 may be of any preferred form but is here constructed as follows. Gear 9 provides a tapered friction socket 16 complementary to a tapered friction cone 17 fixed with gear 11, the gear and cone being bodily movable to engage and disengage the cone in the socket by the means of a hand lever 18 fixed on a pivot 19 upon which is also fixed a lever 20 connected with a pivoted lever 21 by the means of a rod 22; lever 21 having a pivoted shoe 23 engaging an annular groove 24 formed in the extended hub of gear 11.

Rate changer 13 may be of any preferred form but is here constructed as follows: The gears 25—26—27 are fixed together and slidably splined on a shaft 28 which is driven from gear 12, fixed thereon, and are of different diameter, adapted for engagement one at a time with complementary gears 29—30—31 respectively. Gears 29—30—31 are fixed on a shaft upon which is also fixed the gear 14. The gears 25—26—27 may be moved to engage the respective gears 29—30—31 by the means of a hand lever 32 fixed on a pivot 33 upon which is also fixed a lever 34 having a pivoted fork 35 engaging with the end faces of the gear 26.

Figure 5:
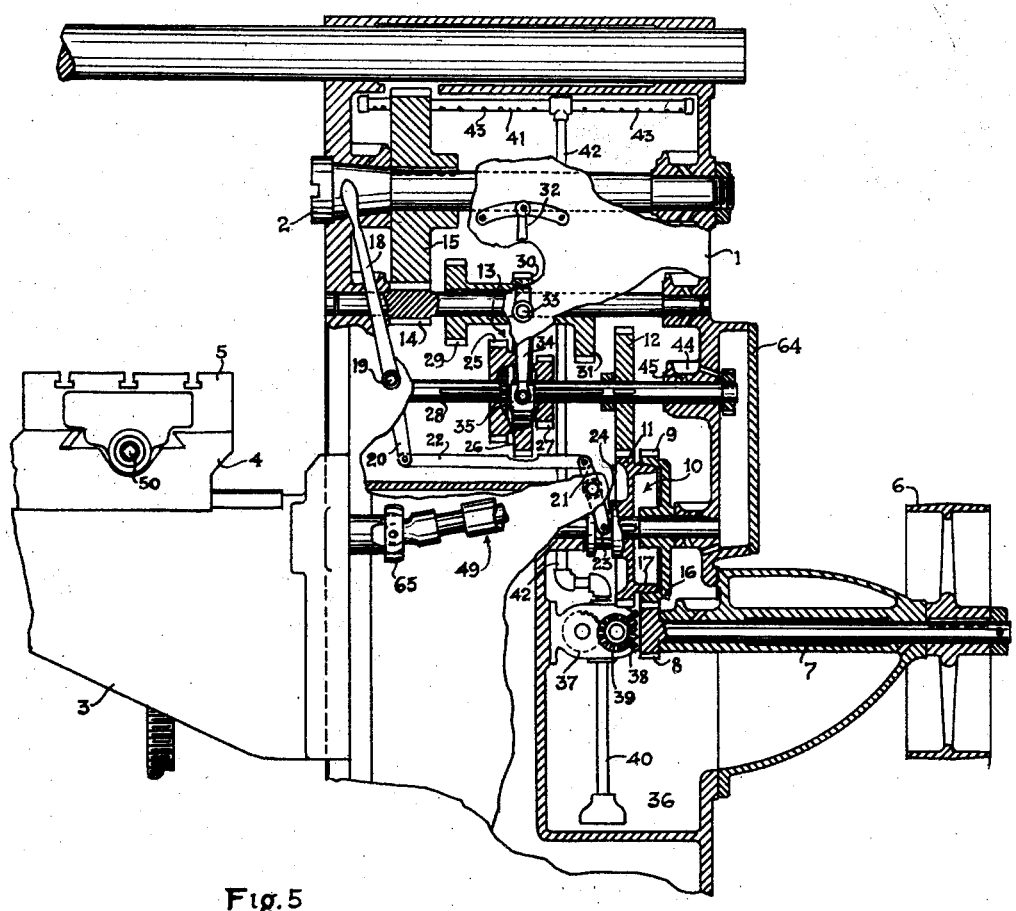
Fig. 5 is a view of the column partly in section to show the relations of the various gears and levers.

The spindle train just described is automatically continuously lubricated by the means of the following lubricating system. Within the hollow column there is provided at a lower level thereof a lubricant reservoir 36. A pump 37 which may be of any preferred form and will therefore not be described in detail, is driven from shaft 7 of pulley 6 by the meshed bevel gears 38—39 and draws lubricant from the reservoir through a suction pipe 40 and delivers it to a header 41 through a header pipe 42, the header being provided with openings 43 from which lubricant sprays into the interior of the column to reach the various gears from which it is thrown off to return to the reservoir, said column constituting a passageway for fluid coming from said header. For the bearings of the various shafts, there are pockets provided to receive the drops of oil either directly from the header, or indirectly from the gears or from the column walls. Such a pocket is shown for shaft 28, Figs. 2 and 5, at 44. From such pockets channels such as 45 lead to the shaft bearings to supply lubricant thereto, any surplus lubricant which passes through the bearings or overflows the cups being returned to the reservoir through the hollow column. Thus pipe 40, pump 37, pipe 42, header 41, column 1, and reservoir 36 constitute a complete closed fluid circuuit through which the fluid flows at all times when pump 37 is driven.

A table feed train is driven from a point in the spindle train which is between clutch 10 and rate changer 13, as follows. The shaft 28 drives a shaft 46 through a rate changer generally denoted by the numeral 47. A shaft 48 rotatably supported on knee 3 is driven from shaft 46 through an extensible universal joint shaft, generally denoted by the numeral 49, whereby to permit relative movement between the shafts when the knee is moved. Shaft 48 drives a table screw 50 through a train including meshed gears 51—52, a shaft 53, a bevel gear 54 journaled in saddle 4 and slidably splined on shaft 53 and meshing with bevel gear 55, a shaft 56, a bevel gear 57 and a bevel gear 58 meshed with gear 57 and slidably splined with the table screw 50, the table screw being rotatably journaled to move axially wth the table 5 in the usual or any suitable manner.

Figure 6:
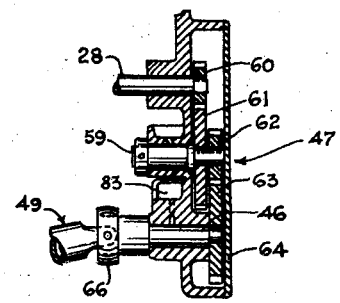
Fig. 6 is a sectional view on the line 6—6 of Fig. 2.

The rate changer 47 may be of any preferred form but as here shown consists of interchangeable gearing removably splined on the ends of shafts 28 and 46 and on an intermediate shaft 59, Figs. 2 and 6. Gears 60—61 of different diameter may be manually reversed in position to alter the rate of shaft 59, and gears 62—63 of different diameter may be manually reversed in position to further alter the rate of shaft 46 whereby shaft 46 may have 4 speeds relative to shaft 28. A removable cover 64, Fig. 1, provides access to the gears for changing their position.

Figure 4:
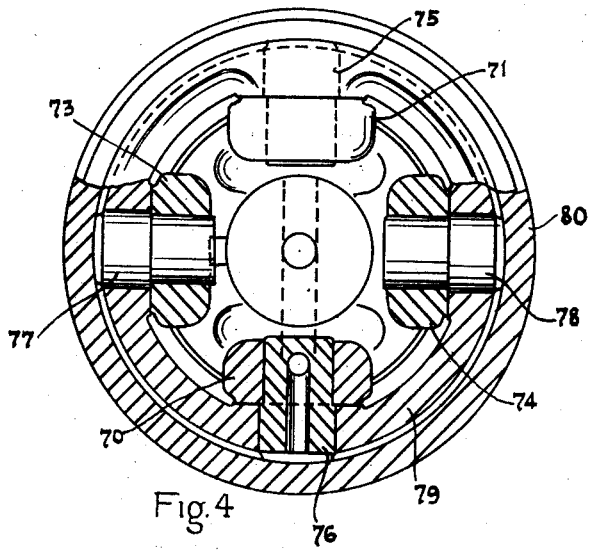
Fig. 4 is a transverse section along line 4—4 of Fig. 3.

The extensible universal joint shaft 49 consists of a plurality of joint or knuckle units 65—66 of similar construction and connected by a telescopic shaft 67. Since the joints are of similar construction only the joint 66 will be described in detail. Referring to Figs. 3-4 the joint includes a driving fork member 68 fixed on shaft 46 and a driven fork member 69 fixed upon or integral with one of the members of the extensible shaft 67. Fork member 68 has lugs or ears 70—71 and fork member 69 has lugs or ears 73—74. Each of the lugs carries a pivot pin fixed therewith, the various pins being indicated at 75—76—77—78 respectively, each pin being pivoted in a block member 79, the axis of the pins in the same fork member being in alignment and at right angles to the axis of the shaft with which the member is fixed and the axes of the pins of the different fork members intersecting at right angles in the same plane whereby the two fork members may rotate although shafts 46 and 67 are angularly disposed as the result of vertical movement of knee 6, as in Fig. 1 and shaft 46 may drive shaft 67 in any position of knee 3. Such angular rotation results in pivoting movement of block member 79 on the pivot pins and while transmitting heavy pressures, and the bearing of the pins in the block 79 therefore should be well lubricated, preferably continuously and automatically and preferably from the spindle train lubricating system previously described.

Such lubrication presents difficulties because the joint necessarily stands outside the hollow column and surplus lubricant is likely to be thrown off and wasted, which would deplete the spindle train lubricant and endanger the spindle train lubrication, and would create an objectionable accumulation of lubricant around the base of the machine.

Such difficulties are substantially or entirely overcome by construction as follows. Block member 79 is provided with a cylindrical exterior or periphery over which is forced a closely fitting ring member 80, the various pivot pins being sufficiently shortened to leave a space forming a small lubricant pocket, such as 81, Fig. 3, between the end of each pin and the ring. The block 79 is provided with an annular peripheral groove 82, forming, when ring 80 is in place, a closed channel communicating between the several chambers at the ends of the pins. One of the chambers 81 in the fork member 68 which is adjacent the column 1, communicates with a pocket 83, Figs. 2-3, which is within the column 1 and adapted to receive lubricant from the lubricating system for the spindle train as previously described. there being communicating channels 84, 85, 86, 87, 88 from the pocket 81 to an annular groove 89 adapted to deliver lubricant to such channels in any position of rotation of fork 68 and during such rotation, and a channel 90 from the pocket 83 to the annular groove 89.

By the described construction the pivots are continuously supplied with lubricant through closed channels, but unless precautions are taken it may work through the pin bearings and along the bearings such as 91, Fig. 3, between the fork members and block 79. To reduce such wasted fluid to a negligible quantity the lip 92, Fig. 2, of pocket 83 provides an overflow but slightly above the level of the channel 87, Fig. 3, to which the oil level in pocket 83 must rise in order to deliver fluid to the pins. Thus there can be very little pressure to cause a loss of fluid.

The joint 65 as previously stated is similar in construction to joint 66 and it is contemplated that it may be similarly lubricated from a similar lubricating system. In such case the lubricating system would be bodily movable with knee 3, but stationary relative to joint 65 in the same way that the system described may be said to be stationary relative to joint 66. Since such a lubricating means for the joint 65 would present no novelty over the system described for joint 65 and is not claimed, it is not shown.

What is claimed is:

1. In a machine tool the combination of a housing, a drive train supported therefrom and including a universal joint exposed outside said housing, said joint having a plurality of fork members each pivoted with an intermediate block member, a closed lubricant channel associated with said block member and communicating with different pivots respectively in the different forks, a source of lubricant to relatively very low pressure and associated with said housing, and a passage adapted to deliver lubricant from said source to said channel during the rotation of said joint.

2. In a machine tool the combination of a hollow housing, a train supported therefrom including a universal joint exposed outside said housing, said joint including a plurality of fork members each pivoted with a block member intermediate in said train between said fork members; and a lubricating system for the pivots of said joint including a closed lubricant channel associated with said block member and communicating with different pivots respectively in the different forks, a reservoir within said housing, a pump adapted to elevate lubricant from said reservoir, a closed passageway from said pump to said channel, and means including an overflow associated with said passageway to materially reduce the pressure of fluid delivered by said pump.

3. In a machine tool the combination of a hollow housing, a train supported therefrom including a universal joint exposed outside said housing, said joint having a plurality of fork members each pivoted with a block member intermediate in said train between said fork members; and a lubricating system for the pivots of said joint including a closed fluid channel associated with said block member and connecting with different pivots respectively in the different fork members, a fluid reservoir within said housing, a pump adapted to elevate fluid from said reservoir, a pocket adapted to receive fluid from said pump, said pocket having an overflow at a level to maintain a fluid level within said pocket only slightly above said joint, a passageway for the return of fluid from said overflow to said reservoir, and a closed passageway from said pocket to said channel.

4. In a machine tool the combination of a hollow stationary support, a support slidably guided therefrom for movement relative thereto, a rotatable spindle and a rotatable drive shaft each journaled in said stationary support, a train connecting said spindle and drive shaft and housed within said hollow support, a train connecting said drive shaft and the other support and in part exposed outside said hollow support, said exposed train portions including a universal joint having a plurality of fork members and an intermediate block member pivoted with each of said fork members; and a lubricating system including a reservoir within said hollow support, a pump driven from said drive shaft and adapted to elevate fluid from said reservoir to lubricate said spindle train, said hollow support being adapted to return surplus fluid to said reservoir, a closed channel connecting the pivots of said block member, a pocket adapted to receive some of the surplus fluid during its return, and a passage connecting said pocket with said closed channel; said pocket having an overflow within said hollow support and at a level only sufficient to force fluid to said closed channel without material pressure.

5. In a milling machine the combination of an upstanding hollow column, a tool spindle journaled at an upper level of said column, a spindle drive train including gearing within said column, a lubricant reservoir within said hollow column at a lower level thereof, a pump driven from said spindle train and adapted to elevate lubricant to said spindle and gearing, a table drive train including a shaft driven from said spindle driving train and rotatably supported from said column and a universal joint driven from said shaft and having a plurality of bearings for movement about different axes; and lubricating means for said universal joint including a channel adapted to receive lubricant from said pump, and passageways in said universal joint adapted to receive lubricant from said channel and to distribute such lubricant to said plurality of bearings in said universal joint.

6. In a machine tool the combination of a hollow housing, a power train supported in said housing, a shaft having a passage therein, said shaft being driven from said train and extending outside said housing, a universal joint fixed to the outer end of said shaft for driving another power train, lubricating channels in said joint communicating with said passage, means for distributing lubricant within the interior of said housing, a pocket positioned within said housing whereby to receive some of said lubricant, and a duct leading from said pocket and communicating with said passage.

In witness whereof I hereto affix my signature.

EDWARD J. KEARNEY.